March 7, 1933.    G. H. POTH    1,900,464
ELECTROMAGNETIC RECIPROCATING DEVICE
Filed June 11, 1927    6 Sheets-Sheet 1

INVENTOR.
G Henry Poth
BY
ATTORNEY.

March 7, 1933.    G. H. POTH    1,900,464
ELECTROMAGNETIC RECIPROCATING DEVICE
Filed June 11, 1927    6 Sheets-Sheet 2

INVENTOR.
G. Henry Poth
BY
ATTORNEY.

March 7, 1933.   G. H. POTH   1,900,464
ELECTROMAGNETIC RECIPROCATING DEVICE
Filed June 11, 1927   6 Sheets-Sheet 3

INVENTOR.
G. Henry Poth
BY
ATTORNEY.

March 7, 1933.  G. H. POTH  1,900,464
ELECTROMAGNETIC RECIPROCATING DEVICE
Filed June 11, 1927   6 Sheets-Sheet 4

INVENTOR.
G. Henry Poth
BY
ATTORNEY.

March 7, 1933.  G. H. POTH  1,900,464
ELECTROMAGNETIC RECIPROCATING DEVICE
Filed June 11, 1927   6 Sheets-Sheet 5

INVENTOR.
G. Henry Poth
BY
Leo P. Parker
ATTORNEY.

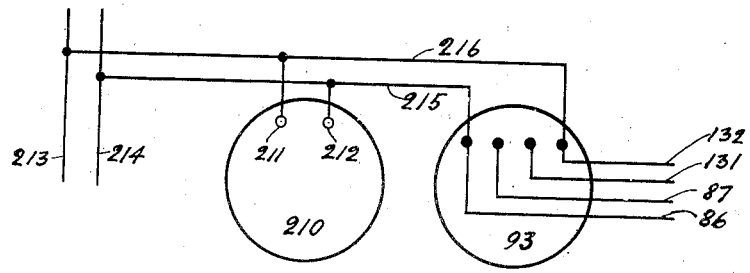
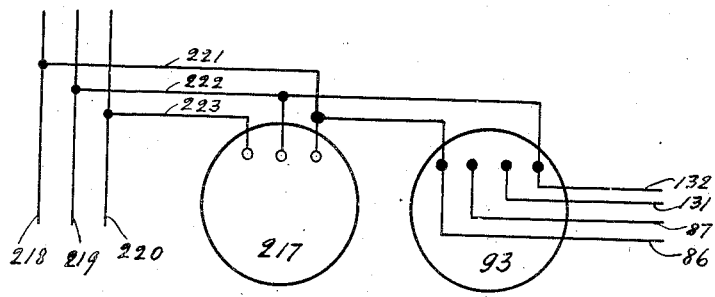
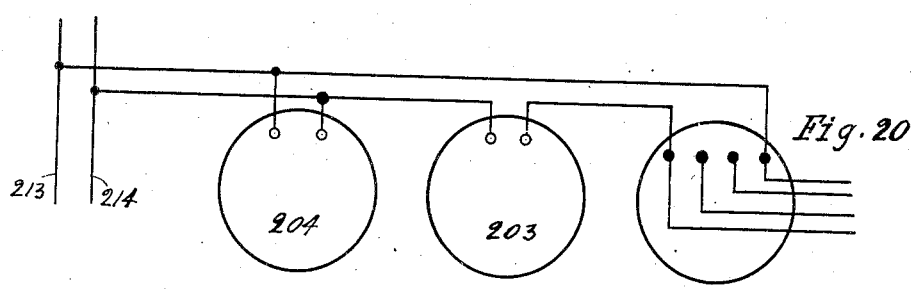
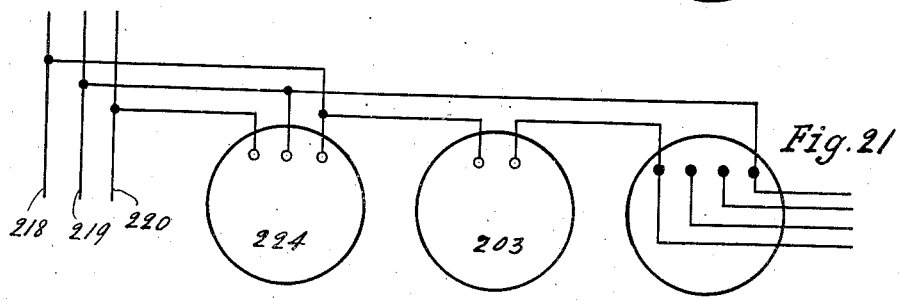

Patented Mar. 7, 1933

1,900,464

UNITED STATES PATENT OFFICE

GEORGE HENRY POTH, OF CINCINNATI, OHIO

ELECTROMAGNETIC RECIPROCATING DEVICE

Application filed June 11, 1927. Serial No. 198,137.

The invention relates to means for operating electromagnetic reciprocating tools.

Briefly the improvements of the present invention over the invention described in my Patent No. 1,407.804 consist in the utilization of alternating current, instead of a pulsating direct current as a source of power for operating the reciprocating member, by means adapted to automatically intermittently permit the conduction of current to the means operating the reciprocating device. It being quite apparent that two successive waves of alternating current, or one complete cycle, will effect the equivalent electrical result of two successive waves of pulsating direct current when applied in opposite directions.

The objects of the invention are to provide simple, efficient and practical means utilizing alternating current for operating any apparatus or system requiring an intermittent supply of current or energy, for instance, such as electric flasher signs, or electromagnetic striking tools, such as vibrators for use in foundries and hammering, chiseling, chipping, calking, riveting and drilling devices, and the like, in which a reciprocating plunger is operated; to provide an efficient, reliable and universal apparatus for the operation of this class of devices characterized in the economical feature, particularly, that the means for effecting the movements of the reciprocating elements is unadapted to become worn, whereby frequent repairs and replacements of such means is obviated; to provide a device of the class described in which slip rings, contact brushes, and the like are eliminated whereby said device is adapted to be practically utilized under any and all circumstances in an absolutely dependable and safe manner and with sparkless operation; to provide means for the intended purposes in which the windings of the device are at no time open; to provide means to properly direct the electric current of the device to the windings, whereby the operation of the plunger, or striking element, is brought about entirely automatically in and by the apparatus supplying the current, whereby the use of condensers, electrolytic valve cells, safety resistances, and the like, used in the prior art for the purpose of suppressing sparks, are eliminated; and to provide means whereby the average power applied to the striking element or plunger, in its working stroke, is materially increased.

The invention consists in providing a distributor which operates in synchronism with the voltage of the source of supply and which controls the flow of the current to the tool to effect reciprocation of the reciprocating member or plunger. Moreover, the flow of the current through the operating tool coils, during the return stroke of the plunger, is automatically prevented without mechanically interrupting any part of the circuit or circuits.

The invention, also, consists in the combination of the elements, arrangement of the parts and in the details of the construction, as set forth and claimed:

In the drawings:

Fig. 18 is a diagrammatical view showing a method of utilizing the two generators, one as a motor;

Fig. 19 is a diagrammatical view showing a modified method of connecting the invention shown in Fig. 18;

Fig. 20 is a diagrammatical view showing a modified method of utilizing two generators, one as a motor; and Fig. 21 is a diagrammatical view showing a modified method of connecting the invention shown in Fig. 20.

Figure 1:
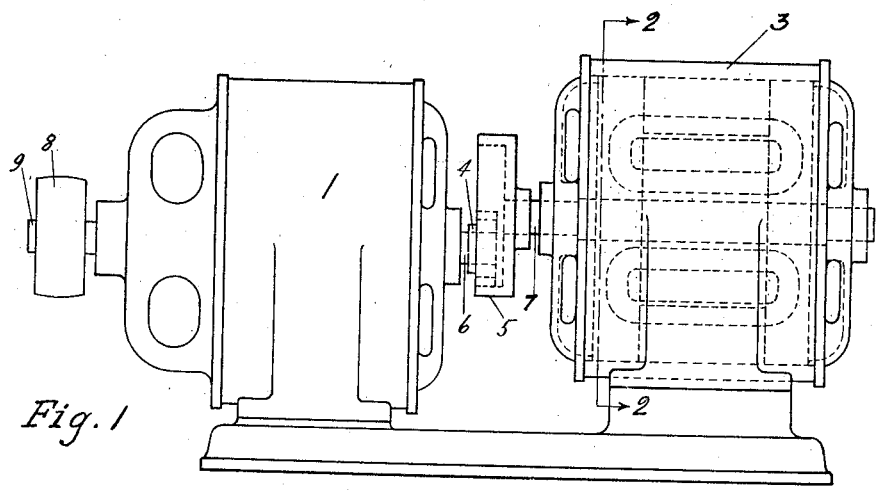
Fig. 1 is a side elevation of the invention.
Figures 2, 3:
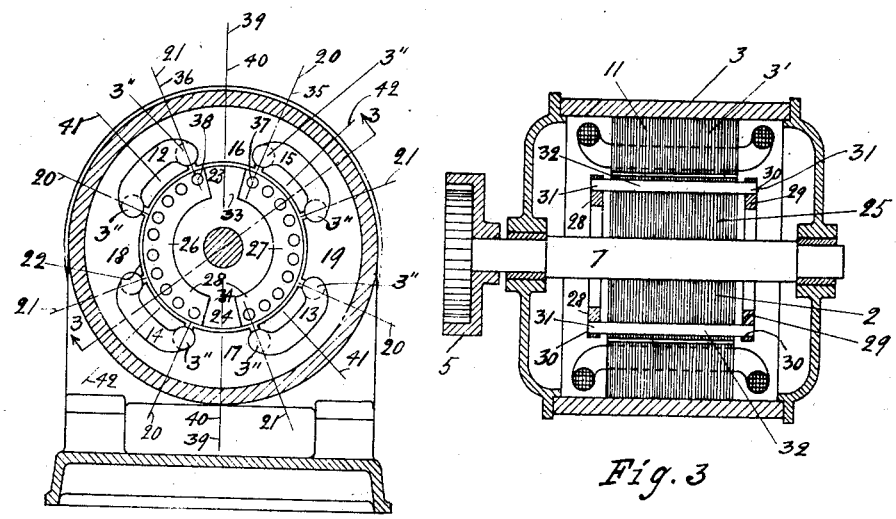
Fig. 2 is a section taken on a line corresponding to 2—2 in Fig. 1.
Fig. 3 is a section of the distributor taken on a line corresponding to 3—3 in Fig. 2.

In the preferred construction of the invention, shown in Figs. 1, 2 and 3, I provide a usual four pole alternating current generator 1 connected with the rotor 2 of the distributor 3, as by meshing gears 4 and 5, respectively fixed to shafts 6 and 7, respectively, fixed to the armature (not shown), of the generator 1, and the rotor 2 of the distributor. The shaft 6, of the generator, is driven, as usual, by suitable power applied to the pulley 8 fixed to the end 9 of the shaft. The ratio of the number of the teeth of the gears 4 and 5, of the generator 1 and the distributor 3, is 1:2.

The alternating current generator 1 may be of the consecutive pole type, having four poles, which operates at a speed of 1800 R. P. M. and therefore delivers 3600 cycles each minute. It is used in connection with the mechanism described for operation of the vibrator shown in Fig. 4. As hereinafter explained, the generator 1, or combination of other generators, may be any suitable type capable of producing a duo-directional E. M. F. of any character.

The stator 11, of the distributor 3, is constructed substantially the same as the stator of an induction motor and consists of the usual laminated iron rings 3' or core having spaced apart 3" slots therethrough. The slots receive the coils 12, 13, 14 and 15 which are disposed symmetrically at 90 degrees, whereby the open sections 16, 17, 18 and 19 are provided between the coils. The coils are, of course, insulated from the iron. Each of the sections are 45 degrees in width, circumferentially of the stator as measured from the center lines 20 and 21 of the slots 3" in the stator. The rotor 2 is mounted in the cylindrical bore 22 in the stator and spaced therefrom.

The rotor 2, of the distributor 3, is constructed substantially the same as a squirrel cage rotor of an induction motor, except that the open sections 23 and 24, disposed diametrically opposite from each other, contain no electrical conductors in the core or laminated iron 25. In other words, the rotor 2 comprises the cages 26 and 27, each consisting of the end plates 28 and 29 having holes 30 therein. The holes 30 receive the ends 31 of the spaced apart conductor bars 32. The cages 26 and 27 are separated from each other, as also are the adjacent end plates 28 and the adjacent end plates 29, whereby the open spaces 33 and 34 are found between the plates, respectively.

An important feature of the arrangement of the cages 26 and 27 is that the center line 35 and 36, of the end bars 37 and 38 of the bars 32, are spaced substantially the same number of degrees circumferentially of the distributor 1, as the spacing of the lines 20 and 21 between the slots 3". The bars 32 of the respective cages 26 and 27 are electrically connected or short circuited through the respective end plates 28 and 29. And the cages are preferably entirely insulated from the iron 25 of the rotor 2.

The rotor 2 is driven in synchronism with the voltage of the generator 1. The voltage is zero when the center lines 39 of sections 23 and 24 register with the center lines 40 of the stator sections 16 and 17, respectively; and when the center lines 39 of the sections 23 and 24, respectively, register with either the center lines 41 of the coils 12 and 13, or with the center lines 42 of the coils 14 and 15. Therefore, one quarter of the circumference of the stator 11 corresponds to the duration of one complete cycle.

Figure 4:
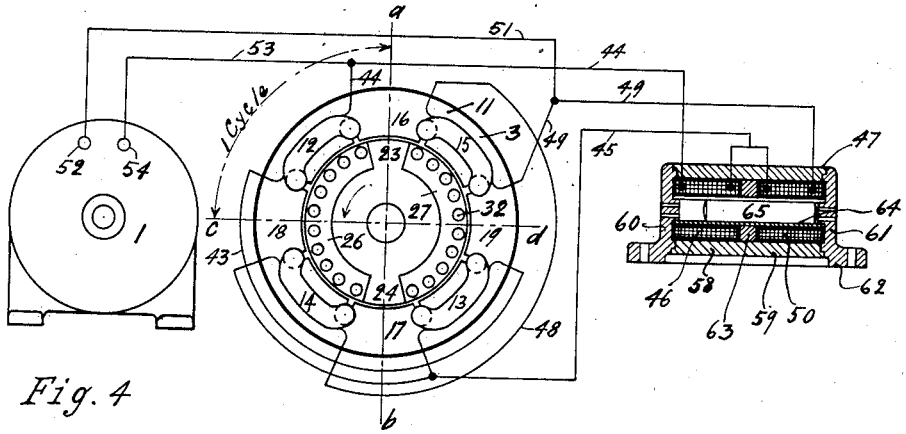
Fig. 4 is a diagrammatical view of the invention and showing a vertical section of the vibrator.

As shown in Fig. 4, the opposite coils 12 and 13 are connected in series as by the conductor 43. The coils 12 and 13 are connected with the conductors 44 and 45 which, respectively, connect the ends of the coil 46, of the vibrator 47. The opposite coils 14 and 15 are connected in series by the conductor 48. The coils 14 and 15 are connected with the conductors 45 and 49 which, respectively, connect the ends of the coil 50 of the vibrator 47. The conductor 51 connects the terminal 52, of the generator 1, with the conductor 49. The conductor 53 connects the terminal 54 of the generator with the conductor 44.

Figures 5, 7:
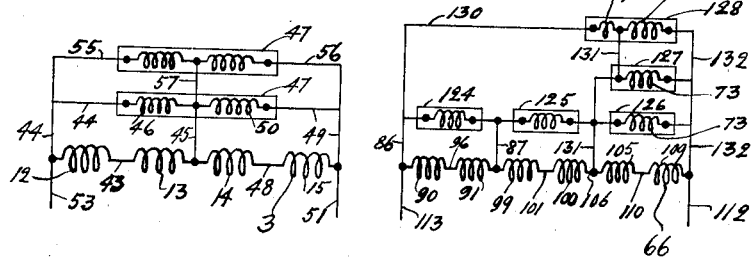
Fig. 5 is a diagrammatical view showing a method of connecting a plurality of vibrators.
Fig. 7 is a diagrammatical view of the form of the invention shown in Fig. 6, showing a method of connecting a plurality of hammers.

In Fig. 5 is shown a plurality of vibrators 47 connected in parallel with the conductors 55 and 56 which connect conductors 44 and 49. And the conductor 57 connects the coils of the vibrator with the conductor 45.

The vibrator 47 is of usual type and consists of casing 58 comprising magnetic material cylinder 59 having magnetic material end covers 60 and 61 connected therewith and formed into base 62. Between the coils 46 and 50, and within the cylinder 59, is yoke 63 formed from suitable magnetic material. Inside the yoke 63 and the coils 46 and 50, and extending from cover 60 and to cover 61, is split metal tube 64 having slidably received therein the plunger 65.

When the rotor 2 rotates counter-clockwise the sections 23 and 24, of the rotor are caused to move across the coils 12 and 13, respectively, (from the position represented by the line $ab$ to the position represented by the line $cd$), whereby two voltage waves or one complete cycle is impressed upon the coils 12 and 13, for the reason that the sections 23 and 24 form a natural pass for the magnetic flux set up in the coils 12 and 13, whereas substantially no voltage will be impressed upon the coils 14 and 15, because of the form of the construction of the modified squirrel cage winding previously described. The coils 12 and 13 consume the complete supply voltage from the generator during the movement of the rotor 2 from the line $ab$ to the line $cd$. The vibrator coil 46 is, therefore, excited at the period when the coil 50 is inoperative or dead, whereby the plunger 65 is caused to perform a stroke toward the end cover 60 of the vibrator. Both the magnetizing currents of the coils 12 and 13, and the current consumed by the vibrator coil 46, flows through the coils 14 and 15 without creating any voltage in the latter coils due to the squirrel cage winding comprising sections 26 and 27 of the rotor 2.

During the next succeeding quarter revolution of the rotor 2, a magnetic action occurs in reverse of that just previously explained. In other words, the coils 14 and 15 will be excited while coils 12 and 13 are dead, whereby the vibrator coil 50 is excited at the same period the coil 46 is dead or inoperative. As a result of which the plunger 65 is caused to perform a stroke toward cover 61 of the vibrator. In the next succeeding quarter revolution, of the rotor 2 the coils 12 and 13 are excited, while during the same period the coils 14 and 15 are dead. In this manner the plunger 65 is successively operated from one cover 60 to the other cover 61, and vice versa. In other words, the rotation of the rotor 2, with relation of the stator 11, alternately changes the impedance of the coils 12, 13, 14, and 15 from substantially zero to a maximum, hence the voltage impressed upon these coils is varied, whereby the current through the vibrator coils 46 and 50 is alternately admitted and substantially stopped.

One complete revolution of the rotor 2 comprises four complete cycles of the current, and consequently two complete movements of the plunger 65 toward each of the end covers of the vibrator 47 is accomplished, or a total of four blows of the plunger.

It is apparent that if the four pole generator 1 is driven at a speed of 1800 R. P. M., then two cycles of the current for each revolution are effected, and consequently 3600 cycles are effected for each minute duration. Therefore, the rotor 2, of the distributor 3, will operate at a speed of 900 R. P. M., and in doing so 3600 distinct movements of the plunger 65, of the vibrator 47, are effected.

Similar results, of course, may be obtained by substituting a two-pole generator for the four-pole generator 1, under the circumstances that it is operated at a speed of 3600 R. P. M., whereby the speed of the distributor 3 will, under these conditions, remain the same as when it is operated by the use of the four-pole generator operated at a speed of 1800 R. P. M.

Moreover, a six-pole generator may be utilized, when it is operated at a speed of 1200 R. P. M., for effecting the rotatable speed of 900 R. P. M. of the distributor. If, however, a six-pole generator is operated at a speed of 1800 R. P. M., three cycles of the current is obtained for each revolution of the generator, which consequently effects 5400 cycles each minute. Under the latter circumstances the rotor 2, of the distributor 3, will operate at a speed of 1350 R. P. M. resulting in 5400 blows being delivered by the plunger 55 of the vibrator.

Figure 6:
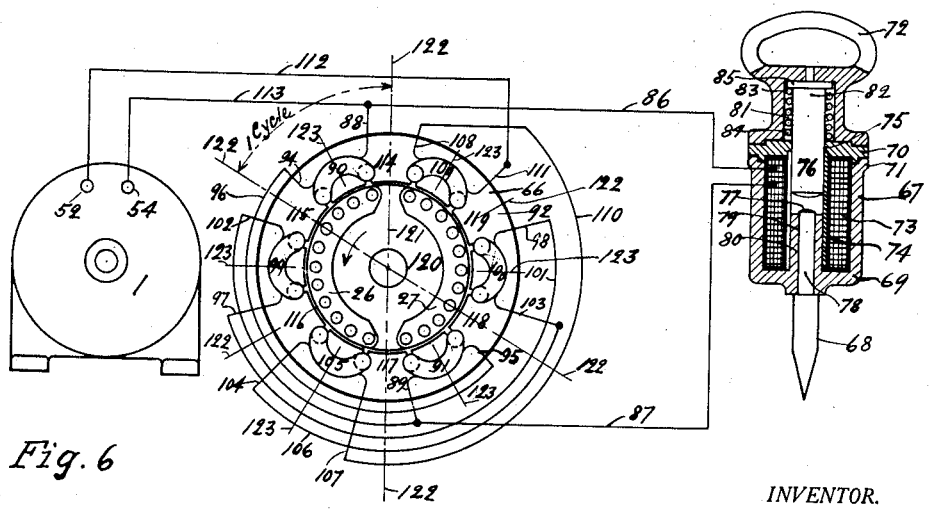
Fig. 6 is a diagrammatical view of a modified form of the invention connected with a hammer shown in vertical section.

In Fig. 6 I show the distributor 66 capable of utilization for the operation of a hammer 67, the blows of which are effected by a modified form of the mechanism previously described. The hammer 67 may be utilized in operating any desirable striking tool 68 which may be used as a chipping, calking, or riveting device, or the like.

The hammer 67 consists of a housing 69 having the plate 70 fixed to its top 71. The handle 72 is suitably secured to the plate 70 and the housing 69. Inside the housing 69 is located a coil 73 which is wound about a suitable insulator spool 74. Slidable in the centrally disposed hole 75, of plate 70, is the plunger 76 which is adapted to contact the upper end 77 of the tool 68. The shaft 78, of the tool 68, is slidably mounted in the bearing 79 which is in the boss 80. The boss 80 is integral with the casing 67 and extends inwardly thereof, the bearing 79 being aligned with the hole 75.

The spring 81, around the upper end 82 of the plunger 76 has its upper and lower ends 83 and 84, respectively, in engagement with the head 85, of the plunger, and the plate 70, whereby when the coil 73 is excited the plunger 76 is caused to move downwardly in contact with the upper end 77 of the tool 68. During the downward stroke of the plunger the end 83 of the spring 81 engages the head 85 of the plunger, whereby the spring is compressed. When the current in the coil 73 has disappeared the spring 81 causes the plunger to move upwardly into the position shown in Fig. 6.

It is practical to allow for the return or upward stroke of the plunger 76 a greater time interval than is allowed for the working stroke or downward stroke. The reason for this is that if the period of the return stroke and working stroke of the plunger were the same, the amount of energy exerted during the return stroke would cause an undesirable kick against the hand of the operator, as well as unnecessarily decreasing the economical operation and maintenance of the hammer. Moreover, where the period of time for the return stroke is considerably longer than the period of time for the working stroke, a relatively light or weak spring may be utilized which consequently results in a relatively small loss of energy, during the working stroke of the plunger, in the necessary operation of compressing the spring. The time allowed for the return stroke of the plunger may be approximately twice the time allowed for the working stroke.

The ends of the coil 73 are connected, as by the conductors 86 and 87, to the ends 88 and 89 of the oppositely disposed coils 90 and 91 on the stator 92 of the distributor 66. The opposite ends 94 and 95, of the coils 90 and 91, are connected by the conductor 96.

The ends 97 and 98, of the oppositely disposed coils 99 and 100 (adjacent the coils 90 and 91), are connected as by the conductor 101. The end 102, of the coil 99, is connected to end 89 of the coil 91. The end 103, of the coil 100, is connected to end 104, of the coil 105, as by the conductor 106. The end 107, of the coil 105, is connected to the end 108, of the coil 109, as by conductor 110. The end 111 of the coil 109, is connected to the terminal 52, of the generator 1, as by the conductor 112. The terminal 54, of the generator, is connected to end 88, of the coil 90, as by the conductor 113.

In the forms of the invention shown in Figs. 6 and 7, the source of electrical supply may be a four-pole generator operating at 1800 R. P. M. under which circumstances the stator 92, of the distributor 66, is provided with coils 90, 91, 99, 100, 105 and 109 which are disposed diametrically of the stator so that the center points of the coils are spaced 60 degrees from each other. The width of each coil circumferentially is 30 degrees, whereby the section 114, 115, 116, 117, 118, and 119 (between the coils) each have a width of 30 degrees circumferentially of the stator. The rotor 120 is constructed similar to the rotor 2, shown in Figs. 2 and 4, except that the cages 26 and 27 are spaced apart circumferentially 30 degrees, instead of 45 degrees. However, the distributor shown in Fig. 6 is operated in synchronism with the generator 1, whereby the voltage is zero when the center line 121, between the cages 26 and 27, register with the center lines 122 of the sections 114 and 117, 115 and 118, and 116 and 117. The voltage, also, is zero when the center line 121 registers with the center lines 123 of the coils 90 and 91, 99 and 100, and 105 and 109. Therefore, 60 degrees circumferentially, as measured from the center line 122 of either section 114, 115, 116, 117, 118, 119 to the center line of the adjacent section, corresponds to the duration of one complete cycle, whereby six cycles are effected by one complete revolution of the rotor.

In Fig. 7 is shown a diagrammatical view of the form of the invention shown in Fig 6, and in which is shown a method of connecting a plurality of hammers 124, 125, 126, 127 and 128 with the distributor 66.

In the hammer 128 the spring 81 is substituted by the coil 129 having one of its ends connected, by the conductor 130, with the conductor 86. The conductor 86, also, is connected with the hammer 124. The other end of the coil 129 is connected, by the conductor 131, with the one end of the coil 73 in the hammers 128, 126 and 127, and to conductors 106. The other ends of the coils 73 of the hammers 126, 127 and 128 are connected, by the conductor 132, and to the conductor 112. The coil 129, of the hammer 128, has a fewer number of turns than the coil 73 for the same reason that a weak spring 81 is used in the previously described hammers.

Figure 8:
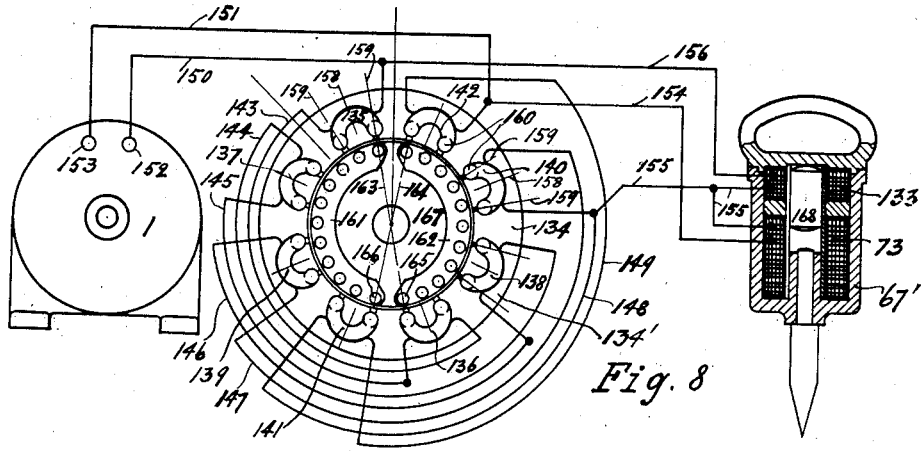
Fig. 8 is a diagrammatical view of another form of the invention shown connected with a modified form of a hammer.

In Fig. 8 is shown another modified form of the invention, in which the hammer 67' is provided with the coils 73 and 133. The distributor 134 is provided with four pairs of coils, namely 135 and 136, 137 and 138, 139 and 140, and 141 and 142. The coils 135 and 136, 136 and 137, 137 and 138, 138 and 139, 139 and 140, 140 and 141, and 141 and 142, respectively, are connected with the conductors 143, 144, 145, 146, 147, 148 and 149. The coils 135 and 142, respectively, are connected through the conductors 150 and 151, with the terminals 152 and 153 of the generator 1. The working coil 73 is connected, through the conductors 154 and 155, with the conductors 151 and 148, respectively. The coil 133 is connected, through the conductors 156 and 155, with the conductors 150 and 148, respectively.

The center lines 158 of the coils 135, 136, 137, 138, 139, 140, 141 and 142, of the stator 134', are spaced 45°, whereas the total width of each coil, as measured circumferentially of the stator from the center lines 159 of the slots 160 is 22½°. The cages 161 and 162 are spaced apart 22½° as measured from the center lines 163 and 164 of the end bars 165 and 166 of the cages.

Figures 9, 11:
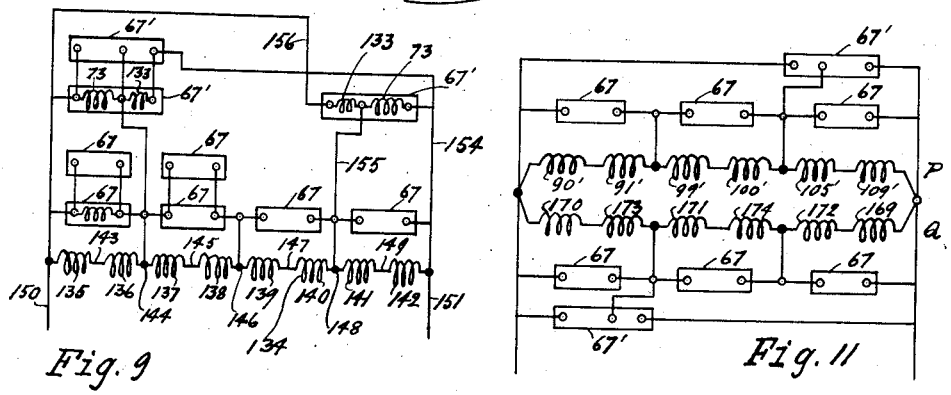
Fig. 9 is a diagrammatical view of the form of the invention shown in Fig. 8 and showing a method of connecting a plurality of hammers.
Fig. 11 is a diagrammatical view of the invention shown in Fig. 10 and showing a method of connecting the hammers.

In Fig. 9 is shown a plurality of single coil hammers 67 and double coil hammers 67' connected with the distributor 134. The connections of the parts in this figure are plainly understandable without further description, it being understood that as many hammers as desirable may be connected, in parallel, to each pair of the distributor coils.

In the form of the invention shown in Figs. 8 and 9, when the rotor 167 is rotated in counter clockwise direction, the pair of the coils 135 and 136 are excited, then the coils 137 and 138 are excited, and so on, in consecutive order, but in each instance when a pair of the coils are excited all of the other pairs of the coils are dead. In this manner each pair of the coils are excited every fifth cycle of the current, and one cycle effects a single working or downward stroke of the plunger 168 of the hammer. Three cycles of the current are utilized for effecting the return stroke of the plunger. Therefore, one blow of the hammer is effected for each one-half revolution of the rotor 167, and two blows of the hammer are effected for each complete revolution of the rotor. When the four-pole generator 1 is operating at 1800 R. P. M. 3600 cycles a minute is effected, as a result of which the rotor runs at 450 R. P. M. thereby effecting 900 blows of the hammer for each minute duration.

In this form of the invention, where the return stroke of the plunger 168 is effected by the coil 133, the large coil 73, (which effects the working stroke of the plunger) is connected across the pair of the stator coils which are connected directly to the line 151 of the generator and, therefore, the coil 133 of the hammer receives the power impulses from the other pairs of the stator coils. There will be three weak impulses for the return stroke of the plunger, from pairs of coils 135 and 136, 137 and 138, and 139 and 140.

The utilization of four pairs of the stator coils, shown in Fig. 8, results in one-half revolution of the rotor 167 corresponding to four cycles of the current which is required to effect one working stroke and one return stroke of the plunger of the hammer. Therefore, the ratio of the periods required for the working stroke and the return stroke of the plunger is 1:3, whereas in the form of the invention shown in Fig. 6 the ratio is 1:2.

Again referring to Fig. 8, when a four-pole generator is operated at 1800 R. P. M., the speed of the rotor 167 is 450 R. P. M. This will be equivalent to eight cycles for each revolution of the rotor, or 900 blows each minute for the hammer 67'.

Figure 10:
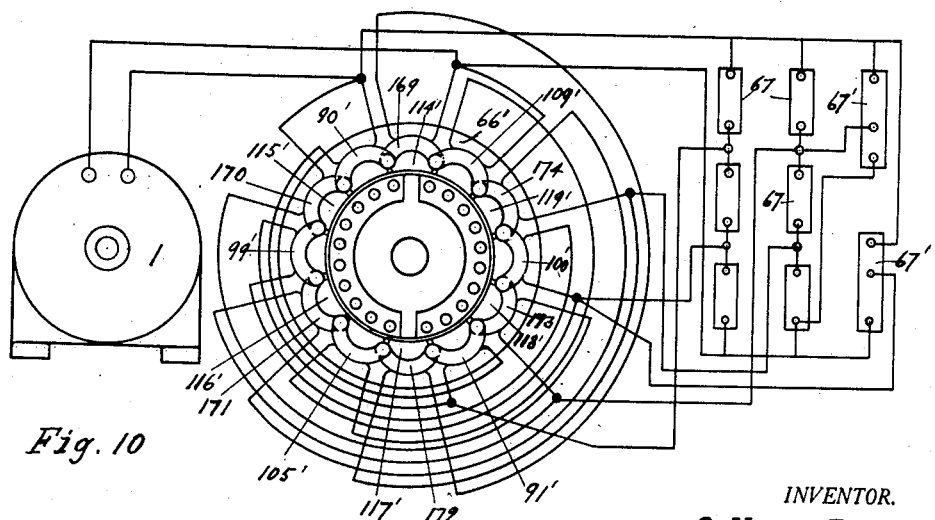
Fig. 10 is a diagrammatical view showing another modified form of the invention.

In Fig. 10 is shown the distributor 66', similar to the distributor 66 shown in Fig. 6, except that in the distributor 66' the sections 114', 115', 116', 117', 118' and 119', between the set P of the coils 90', 99', 105', 91, 100' and 109', contain the set Q of the coils 169, 170, 171, 172, 173, and 174.

The two sets P and Q of the coils are connected in parallel, as shown in Fig. 11. The hammers 67 and 67' are connected in a usual manner, as previously described, to the sets P and Q of the coils.

Figure 12:
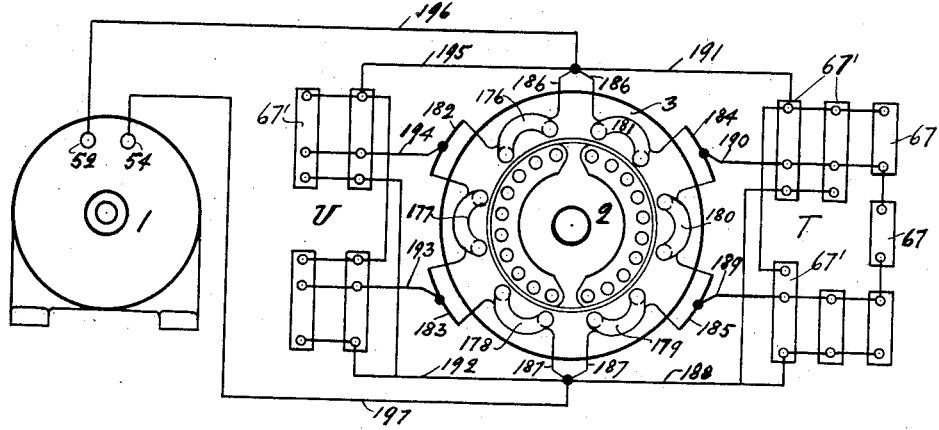
Fig. 12 is a diagrammatical view showing another modified form of the invention.

In Fig. 12 is shown another modified form of the invention and arrangement of connecting the coils. The distributor is provided with the spaced apart coils 176, 177, 178, 179, 180 and 181. The coils 176, 177, and 178 comprise the group R which are connected in series as by the conductors 182 and 183. The coils 179, 180 and 181 comprise the group S which are connected in series as by the conductors 184 and 185. The groups R and S of the coils are connected as by the conductors 186 and 187 which connect the coils 176 and 181, and 178 and 179, respectively.

The single coil hammers and double coil hammers 67 and 67' respectively, in the group T, are connected to each other in a usual manner. The conductors 188, 189, 190 and 191, connected with the hammers, are connected with the conductors 187, 185, 184 and 186, respectively.

The double coil hammers 67', in the group U, are connected with each other, in a usual manner. And the conductors 192, 193, 194 and 195, connected with the hammers, are connected with the conductors 187, 183, 182 and 186, respectively. The conductors 196 and 197 connect the terminals 52 and 54, of the generator 1, with the conductors 186 and 187, respectively.

The important difference between the forms of the devices shown in Figs. 12 and 6, is that in Fig. 6 is shown three groups of coils, each group consisting of two coils in series, whereas in Fig. 12 is shown two groups of coils connected in parallel, and each group consists of three single coils.

Figure 13:
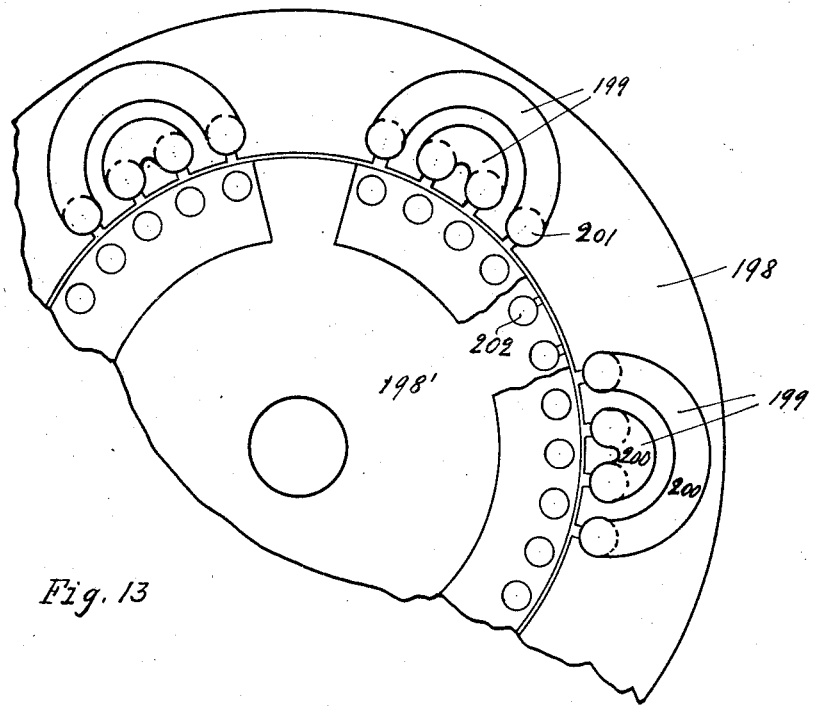
Fig. 13 is a diagrammatical view, with parts broken away, showing modified form of the stator.

In Fig. 13 is shown another modification of the invention consisting of the distributor stator 198 having connected thereto a plurality of the distributed type of coils 199 comprising two or more coils 200. This form of the invention utilizes the usual type of winding used in induction motor windings. The winding slots 201 and 202, respectively, of the stator 198 and the rotor 198' may be of the partly closed type, which is well known in the art of induction motor structure.

Figure 14:
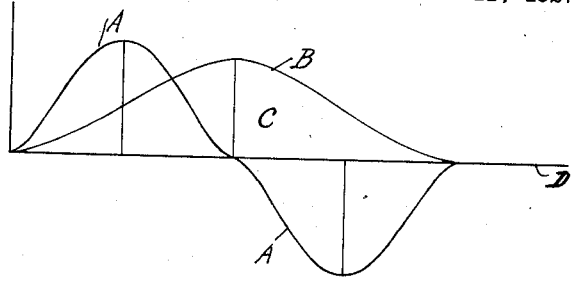
Figs. 14, 15 and 16 are diagrams illustrating the electrical and magnetic conditions, as fully explained hereinafter.

An important feature of the invention consists in utilizing a source of supply having an unsymmetrical voltage curve. In Fig. 14 A represents the voltage curve of the alternating current generator and B the magnetic field set up by this voltage in the tool coil 73. It is well known that the magnetic energy of this coil depends upon the area C between the field curve B and the horizontal line D. One method of increasing the area C is to provide a high maximum flux in the coil 73.

Figure 15:
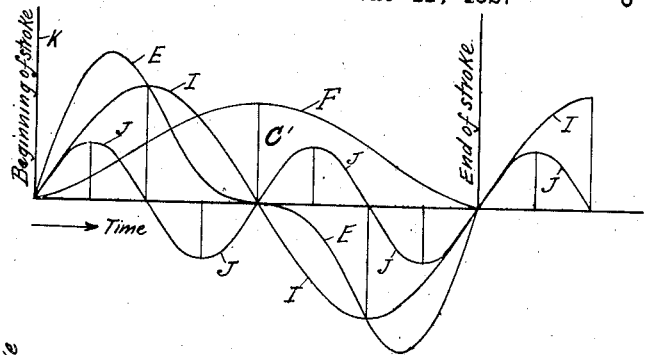
Figure 17:
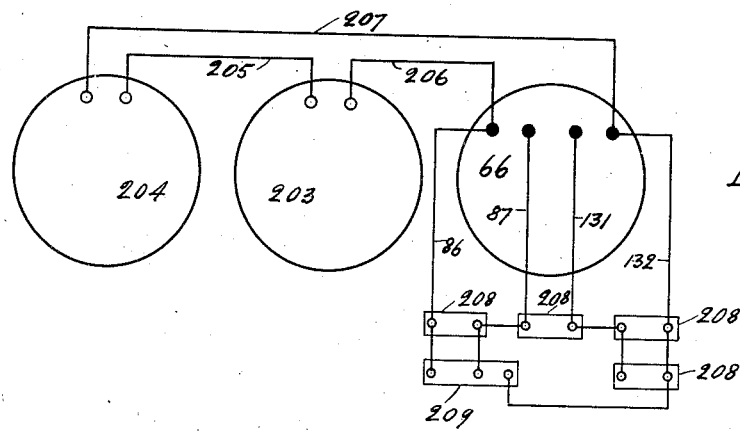
Fig. 17 is a diagrammatical view showing a modification of the application of generators with the invention.

Another novel way to accomplish the same result is to form the voltage curve, of the supply source, so as to quickly build up the magnetic field in the coil 73. This latter method can be accomplished by utilizing an unsymmetrical voltage curve E, shown in Fig. 15, corresponding to the flux curve which is represented by line F. The maximum flux of the curves B and F is almost the same, but curve F arises more quickly or sharply at the beginning of the working stroke of the plunger of the tool, and remains higher towards the end of the stroke, thereby resulting in the area C' being greater than the area C. Since the force applied to the plunger during the working stroke increases with the square of the flux, the total energy imparted to the plunger will be considered greater than the energy represented by the line B. A voltage curve each as E is obtained as by connecting the sources of the two voltages of different frequencies in series as illustrated in Fig. 17. The curve shown in Fig. 15 is the resultant of the two voltages I and J. The voltage J has double the frequency of the voltage I. The generators 203 and 204, which generate the voltages I and J, are connected in series as by the conductor 205. The zero points of the voltage I are in phase with the zero points of the curve J.

The arrangement of the various elements to accomplish this purpose, in connection with the operation of the tools, is illustrated in Fig. 17, where 203 and 204 represent two generators supplying the voltages I and J, respectively. In this figure, 203 represents a two-pole generator while 204 is a four-pole generator. The generators 203 and 204 are coupled mechanically and each are driven at the speed of 3600 R. P. M. The voltage I correspond to 3600 cycles per minute and the voltage J correspond to 7200 cycles per minute. The resultant voltage E has a frequency of 3600 cycles, the same as that of the generator 1, shown in Figs. 1, 4, and 6.

The conductors 206 and 207 may connect the generators 204 and 203 with the conductors 86 and 132 of the stator coils 90 and 109 of the distributor 66 in the form of the invention shown in Fig. 6. The tools 208 and 209 are connected with the conductors 86, 87, 131, and 132 in the similar manner shown in Fig. 7.

As may be determined by reference to the diagram of Fig. 17, the distributor 66 is coupled in such a manner that energizing of the tool coil 73, is accomplished when the voltages I and J have the same direction, or when they act in unison. The closer the maximum point of the curve E moves toward the beginning of the stroke line K, of the plunger of the tool, the higher will be the average value of the area C', and hence the greater the efficiency of the device during the working stroke of the plunger.

Incidentally it will be noticed that the rotor of the distributor must be coupled so that the center lines of the spaces are between the coils, at the period when the curve E is zero at the beginning of the working stroke of the plunger.

Figure 16:
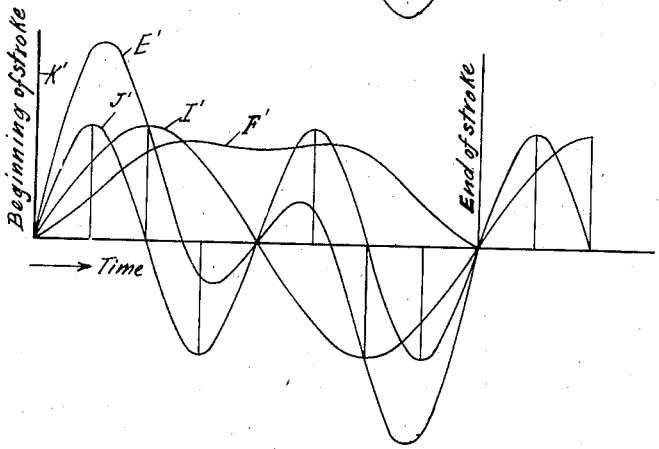

The importance of this feature of the invention is illustrated very clearly in Fig. 16, where both voltages I' and J' have about the same amplitude. The resultant voltage E' is much more distorted and its maximum value is closer to the line K' than is the equivalent voltage shown in Fig. 15. The form of curve F' indicates that its average value is importantly increased.

As shown in Figs. 18 and 19 the supply generator 210, or the generators shown in Figs. 4, 6, 8, 10 and 12, may be used as a synchronous motor by connecting its terminals 211 and 212 to the suitable alternating current single phase lines 213 and 214. The distributor 93, or other suitable distributors, are connected with the generator 210 in a usual manner, as by the conductors 215 and 216. The conductors 132, 131, 87 and 86 lead to the usual reciprocating tools (not shown).

In Fig. 19 is shown a three phase generator 217 connected with the three phase power lines 218, 219 and 220, as by conductors 221, 222, and 223. In this instance the generator 217 operates as a three phase synchronous motor. The current for the distributor 66 is taken from any two of the three phase lines.

In Fig. 20 is shown the single phase generators 203 and 204 which are utilized for the same purpose as the generator 210 shown in Fig. 18. However, since generators 203 and 204 each have different cycles, either of them may be connected with one of the single phase power lines 213 and 214, and it will operate as a synchronous motor.

In Fig. 21 is shown the three phase generator 224, substituted for the generator 204 operated by a three phase power line shown as conductors 218, 219 and 220. In this instance, the generator 224 operates as a three phase synchronous motor.

In the various forms of the distributors any two coils of the stator which are diametrically positioned from each other are connected in the respective circuits in such a manner that when the space between the cages are aligned with the oppositely disposed coils the magnetic flux is free to pass through the rotor from one coil to the other in the same direction.

While I have specified that one working stroke of the plunger is effected by one cycle of the current, however, it is apparent that two or more cycles may effect a single working stroke of the plunger, and corresponding increased number of cycles for the return stroke. For instance, referring to Fig. 6 by reducing the speed of the rotor from 600 R. P. M. to 300 R. P. M. two cycles will effect the working stroke, and four cycles is the duration for the return stroke. In other words, the magnetic field is built up twice during the working stroke.

While I have chosen to illustrate the forms and constructions of the invention by the herein drawings and explanations of the same, it is understood that the invention resides in the combination, arrangement of the parts, and in the details of the construction, as hereinafter claimed. It is further understood that changes in the precise embodiment of the invention, as disclosed herein, can be made within the scope of what is claimed without departing from the spirit of the invention, as other expedients may readily suggest themselves to the art.

What I claim as new and desire to secure by Letters Patent is:

1. The combination with an electro-magnetic reciprocating mechanism, and a supply circuit therefor, of a distributor comprising relatively movable members, means for relatively moving said members, one of said members being provided with windings connected to said supply circuit and to the operating means of said mechanism, another of said members being provided with a plurality of short circuited conductors disposed in inductive relation to said windings of said first mentioned member.

2. The combination with an electro-magnetic reciprocating mechanism, and a supply circuit therefor, of a distributor comprising a stator and a rotor, means for moving said rotor with respect to said stator, said stator being provided with windings connected to said supply circuit and to the operating means of said mechanism, said rotor being provided with a plurality of short circuited conductors disposed in inductive relation to said windings of said stator.

3. The combination with an electro-magnetic reciprocating mechanism, and a supply circuit therefor, of a distributor comprising a stator and a rotor, said stator comprising a core of magnetizable material having a bore and having windings disposed thereon, said windings being connected to said supply circuit and to the operating means of said mechanism, said rotor being rotatably disposed in said bore and comprising a core of magnetizable material carrying a plurality of short circuited conductors disposed in inductive relation to said windings of said stator, said cores forming a path for the magnetic flux set up by said windings of said stator when energized by said supply circuit, whereby a magnetic field in said mechanism is built up and removed, and means for rotating said rotor.

4. The combination with an electro-magnetic reciprocating mechanism, and a supply circuit therefor, of a device comprising reactive windings connected to said supply circuit and to the operating means of said reciprocating mechanism, and means including electric current conducting material suitably arranged and adapted to be brought into and out of mutually inductive relation with said windings for periodically changing the strength of the magnetic field set up by said windings whereby the voltage impressed upon said windings is periodically varied and current is intermittently supplied to the operating means of said mechanism.

5. Means for operating an electro-magnetic reciprocating mechanism comprising a supply circuit carrying a duo-directional electromotive force, and a distributor comprising relatively movable members, means for relatively moving said members, one of said members being provided with windings connected to said supply circuit and connected to the operating means of said mechanism, another of said members being provided with current conducting material adapted to be brought into and out of mutually inductive relation with said windings of said first mentioned member for periodically changing the strength of the magnetic field set up by said windings and for periodically changing the voltage impressed upon said windings so as to obtain for the operating means of said mechanism time intervals of current supply substantially equal to the period of a plurality of tension waves of said supply circuit, whereby a magnetic field in said mechanism is built up and removed once or several times within each of said time intervals of current supply.

6. Means for operating an electro-magnetic reciprocating mechanism comprising a supply circuit carrying a duo-directional electromotive force, and a distributor having relatively movable members, means for relatively moving said members in definite time relation to the electro-motive force pulsations of said supply circuit, one of said members being provided with windings connected to said supply circuit and connected to the operating means of said mechanism, another of said members being provided with a plurality of short circuited conductors movable into and out of mutually inductive relation to said windings of said first mentioned member for causing said windings to be periodically energized and deenergized so as to provide for said operating means time intervals of current supply and time intervals during which substantially no current is supplied, said time intervals of current supply and non-current supply being substantially equal to the period of a plurality of tension waves of said supply circuit, and said time interval of current supply beginning at an instant when the electro-motive force of the supply circuit is approximately zero, whereby a magnetic field in said mechanism is built up and removed within each of said time intervals of current supply.

7. A system for operating an electro-magnetic reciprocating mechanism comprising means for generating electric current, a supply circuit connected to said generating means, and a distributor for intermittently supplying current to the operating means of said mechanism, said distributor having a stator provided with windings connected to said supply circuit and to the operating means of said mechanism, said distributor also having a rotor rotatably disposed and being rotated by said generating means, said rotor being provided with a plurality of short circuited conductors movable into and out of mutually inductive relation with said windings of said stator for causing said windings to be periodically energized and deenergized, whereby a magnetic field in said mechanism is built up and removed.

8. Means for operating an electro-magnetic reciprocating mechanism comprising a supply circuit, an electric motor energized therefrom, and a distributor for intermittently supplying current to said mechanism, said distributor comprising a stator and a rotor, said stator being provided with windings connected to said supply circuit and to said mechanism, said rotor being provided with a plurality of short circuited conductors disposed in inductive relation to said windings of said stator, and said rotor being rotated by said motor.

9. Means for operating an electro-magnetic reciprocating mechanism comprising an alternating current supply circuit, an electric motor energized therefrom, a generator producing alternating current of a frequency different from that of the current of said supply circuit, and a distributor for intermittently supplying current to the operating means of said mechanism, said distributor having a stator and a rotor, said stator being provided with windings connected to said mechanism, said rotor being rotatably disposed and being provided with a plurality of short circuited conductors disposed in inductive relation with said windings of said stator, said generator and said supply circuit being connected in series with each other and being connected in series with said windings of said stator for producing, for the operation of said mechanism, voltage waves of unsymmetrical shape to cause the flux in said mechanism to rise quickly to a high value at the beginning of the period of current supply to said mechanism and to cause said flux to disappear quickly at the end of said period of current supply so as to obtain a high average value for said flux, and said rotor and said generator being positively operated by said motor.

10. In a device of the character described, the combination with a supply circuit, and a consumption circuit, of a device comprising reactive windings co-operating with said supply circuit and conductively and inductively connected with said consumption circuit, means associated in relative motion with said windings for periodically influencing the inductive reactance of said windings, said means comprising a member provided with electric current conducting material being distributed over a portion only of said member, said member also having a path for the magnetic field of said windings said path being formed by the other portion of said member, said conducting material being adapted to be brought into and out of mutually inductive relation to said windings and being adapted to practically neutralize any magnetic flux which is set up by said windings and passes or is tending to pass through said portion occupied by said conducting material without interfering with the magnetic field traversing said second mentioned portion of said member, whereby said windings are periodically energized and de-energized and current is intermittently supplied to said consumption circuit or circuits.

11. The combination with a supply circuit and a consumption circuit, of a distributor comprising relatively movable members, means for relatively moving said members, one of said members being provided with windings connected to said supply circuit and conductively and inductively connected with said consumption circuit, another of said members being provided with a plurality of short circuited conductors distributed over a portion only of said second mentioned member, said second mentioned member also having a path for the magnetic field of said windings of said first mentioned member, said path being formed by the other portion of said second mentioned member, said conductors being disposed in inductive relation to said windings of said first mentioned member and being adapted to substantially neutralize any magnetic flux which is set up by said windings and which passes through the portion of said second mentioned member occupied by said conductors without interfering with the magnetic field traversing said other portion, whereby said windings are periodically energized and de-energized to intermittently supply energy to said consumption circuit.

G. HENRY POTH.